United States Patent Office 3,065,164
Patented Nov. 20, 1962

3,065,164
PROCESS FOR PREPARING MICRO-
CRYSTALLINE WAX
Francis J. Higgins, Ponca City, Okla., assignor to Continental Oil Company, Ponca City, Okla., a corporation of Delaware
No Drawing. Filed Oct. 6, 1958, Ser. No. 765,291
3 Claims. (Cl. 208—31)

The present invention relates to a microcrystalline wax product. More particularly, the present invention relates to a microcrystalline petroleum hydrocarbon wax product having novel properties, thereby permitting novel uses for this product.

A need for better ways of preserving and displaying perishable food products is always existent. This is particularly true of the meat industry. Frozen and pre-packaged meats have been marketed for several years. More recently, frozen meats have been packaged in a coating of wax. This method of packaging of the meat protects the color and flavor of the meat and also avoids moisture loss. Further, the method is subject to automatic operation, thereby reducing packaging labor. Previously available waxes for this use have been of marginal suitability. A need has existed for a wax having the particular properties necessary for this use.

The requirements for a wax suitable for the coating of frozen meat are quite stringent. The wax must be flexible at temperatures as low as —25° F. It must not crack as it solidifies on meat, since a cracked wax film will not preserve meat properly. The film must have sufficient toughness to resist impact and rough handling. Another important requirement is that the wax must not be tacky at room temperatures. This lack of tackiness is very important from a marketing viewpoint. A tacky wax coating is quite objectionable to the housewife, since it will stick to fingers and to table tops. In fact, a tacky wax will stick to anything with which it comes in contact. Also, a tacky wax is objectionable to meat processors and packagers because it causes trouble in machinery due to build-up. Build-up is a condition where the wax accumulates on certain moving parts of the machinery. Tacky waxes have an increased tendency to do this. This build-up interferes with the operation of the machine. Additional requirements include absence of odor or taste and impermeability of the wax film to both moisture and vapors.

Presently available commercial microcrystalline waxes do not meet satisfactorily all of these requirements. In particular, they do not meet the combined requirements of flexibility and lack of tackiness. If they meet one of these requirements, they are deficient in the other. An explanation of this is that previous attempts to produce a wax meeting the flexibility requirement have used waxes containing a high quantity of oil. This, in turn, caused the wax to be tacky. In addition, present commercial waxes contain large quantities of additives.

The present invention obviates the disadvantages of the prior art and provides a microcrystalline wax which is particularly suitable for the coating of frozen meat. Further, the present invention provides a process for preparing this improved microcrystalline wax.

The novel product of the present invention has the following properties:

(a) Melting point of between 120 and 135° F.,
(b) An oil content of less than 2 percent,
(c) Flexibility at —25° F.,
(d) Resistant to thermal shock,
(e) Substantially free of straight-chain paraffinic hydrocarbons.

The novel product of this invention is prepared by the following process:

(a) dissolving a crude petrolatum in a solvent consisting of a mixture of toluene and 2-butanone, wherein the solvent to petrolatum ratio varies from 2 to 10 milliliters of solvent per gram of petrolatum,
(b) heating the solvent and wax to a temperature of from 120 to 150° F. to effect complete solution of the petrolatum,
(c) cooling the solution to a temperature of from 70 to 100° F.,
(d) filtering the cooled solution through a suitable filter medium,
(e) washing the precipitate with fresh toluene-2-butanone solvent in the same ratio as used in step (a) and at the temperature of step (c),
(f) cooling the combined filtrate and washings to a temperature of 40° F. or lower,
(g) filtering the cooled solution through a suitable filter medium,
(h) washing the precipitate with the toluene-2-butanone solvent in the same ratio as used in step (a) and at the temperature of step (f),
(i) removing the residual solvents from the precipitated product by means of distillation and steaming.

2-butanone is sometimes known as ethyl methyl ketone. I prefer the former nomenclature and will use it exclusively hereinafter.

The starting material for the present invention is the waxy material removed from the residual product of the vacuum distillation of lubricating oils. This material is known in the petroleum industry both as crude petrolatum and crude microcrystalline wax. I prefer the term crude petrolatum.

In the first separation, which is carried out at a temperature varying from 70 to 100° F., the hard, brittle, high-melting point, more nearly straight-chain components are removed. I have found that washing the product at this temperature with the same solvent as used in the separation step improves the yield of the materials. The second separation, wherein the mixture is cooled to a temperature below 40° F., generally within a temperature range of 30 to 40° F., removes the oil and low-melting, semi-solid materials. It is advantageous to wash the product at this step with the same solvent as used in the separation step and at the same temperature. Such procedure aids in the removal of any oil components in the material. As to the solvent, I have found that satisfactory results may be obtained by using a solution of toluene in 2-butanone, wherein the toluene content of the solution varies from 40 to 60 percent. For convenience, I prefer to use a solution containing 50 percent toluene and 50 percent 2-butanone. The foregoing percentages are all on a volume basis.

The filter medium for this process is preferably a continuous rotary filter which is well known in the art. In the laboratory, any of the conventional filter mediums may be used.

The color of the novel wax product of this invention may be improved by any of the methods known in the art. Many processes are available for performing this function. For example, it is known that filtration through a percolation clay will improve color. Also, it is known that hydrogenation processes will improve color.

While the primary use of the wax composition of this invention has been in the melt-dip packaging of frozen meat, this invention is not limited thereto. Many other uses for the novel wax composition will be apparent to those skilled in the art of packaging and processing of food products. Still other uses may be apparent to those skilled in other arts dealing with the packaging of goods.

In order to disclose the nature of the present invention still more clearly, the following illustrative examples will be given. It is to be understood that the invention is not to be limited to the specific conditions or details set forth in these examples except in so far as such limitations are specified in the appended claims.

EXAMPLE 1

One hundred grams of crude petrolatum was dissolved in 600 milliliters of a 50/50 toluene-2-butanone solvent. The mixture was heated to 130° F. to effect complete solution. It was then cooled to 80° F., and the precipitated wax was removed by vacuum filtration. The wax precipitate was washed with 600 milliliters of fresh toluene-2-butanone solvent maintained at 80° F., the washings being combined with the filtrate. The solvent was then removed from the filtrate wax, whereupon the filtrate wax was dissolved in 600 milliliters of substantially free toluene-2-butanone solvent by heating the solvent-wax mixture to a temperature of 90 to 100° F. The solution was then cooled to 35° F. and filtered. The precipitated product was washed with 600 milliliters of toluene-2-butanone solvent. The properties of this product are shown in Tables I and II.

EXAMPLES 2 AND 3

The procedure of Example 1 was repeated with the exception that the first separation, step (c), was carried out at a temperature of 70° F. instead of 80° F. In Example 3, the same procedure was followed with the exception that the separation was carried out at a temperature of 60° F. rather than 80° F. The properties of these products are shown in Table II.

EXAMPLE 4

One hundred grams of crude petrolatum was dissolved in 400 milliliters of a 50/50 toluene-2-butanone solvent. The mixture was heated to 150° F. to effect complete solution. The solution was then cooled to 100° F. and filtered through Fisher No. 9-801 paper. The precipitate was washed with 200 milliliters of toluene-2-butanone solvent. The wash solvent was combined with the filtrate, which was then cooled to 35° F. and filtered. The precipitated product was washed with 400 milliliters of toluene-2-butanone solvent. The properties of this product are shown in Tables I and II.

EXAMPLES 5, 6, 7 AND 8

The procedure of Example 4 was repeated with the exception that in Example 5 the second separation was carried out at a temperature of 40° F. rather than 35° F. In Example 6, the same procedure was followed with the exception that in this example the separation was conducted at a tempertaure of 45° F. In Example 7, the solution during the second separation was cooled to 30° F. rather than 35° F. In Example 8, the procedure of Example 4 was again repeated with the exception that in this case the solution during the second separation was cooled to 25° F. The properties of these products are shown in Table II.

Table II

Melt-Dip Testing of Waxes on Frozen Meat

| Wax | Upon Solidifying | After 4 Days' Storage at −20 to −25° F | At Room Temperature (About 75° F.) |
|---|---|---|---|
| Product—Example 1 | No Cracks | No Cracks | Not Tacky. |
| Product—Example 2 | do | do | Do. |
| Product—Example 3 | do | do | Tacky. |
| Product—Example 4 | do | do | Not Tacky. |
| Product—Example 5 | do | do | Do. |
| Product—Example 6 | do | Cracks | Do. |
| Product—Example 7 | do | No Cracks | Slightly Tacky. |
| Product—Example 8 | do | do | Tacky. |
| Crude Petrolatum | Cracks | Cracks | Very Tacky. |
| Commercial Meat Packaging Wax | No Cracks | No Cracks | Do. |
| Microcrystalline Wax "A" | Cracks | Cracks | Not Tacky. |

While the novel product of this invention may be prepared in accordance with the processes used in both Examples 1 and 2, the process of Example 4 is preferred. This preference is for reasons of economy and simplicity in plant operation.

The data presented in Table II show that the wax compositions prepared in accordance with the process of this invention are very satisfactory for the melt-dip coating of frozen foods. Further, it is shown that these wax compositions are superior to a commercially available product. Examination of the data presented in Table I gives an explanation of why these wax compositions are superior for this usage. It is apparent here that the flexibility characteristic has been improved by removing substantially all of the more nearly straight-chain paraffinic hydrocarbons. At the same time, the product has a lower oil content which substantially reduces its tackiness.

As to the temperature ranges specified, those given are preferred. In some cases, temperatures may be employed outside the range specified; and still satisfactory results are obtained. I have found, however, that for consistent, satisfactory results all separations should be conducted within the temperature ranges specified. Describing the process under (b) above, it is stated that the solvent and wax mixture is heated within a temperature range of 120 to 150° F. to effect complete solution. Obviously, temperatures in excess of 150° F. could be employed; however it is generally undesirable to employ such temperatures because of the loss of solvent due to evaporation. The cooling step listed under (c) is somewhat more critical. If the lower temperature is below 70° F., the resulting product many times is tacky; if below 60° F., the product is always tacky. If, on the other hand, the temperature is in excess of 100° F., the resulting product is generally brittle; and as a consequence, wax coating prepared from such a product tends to crack at low temperatures. The temperature employed in step (f) is even more critical. If this step is carried out at a temperature below 30° F., the product is tacky. On the other hand, if the temperature is above 40° F.,

TABLE I

Physical Properties

| Wax | Melting Point, °F.[1] | Percent Oil | Viscosity at 210° F.[4], centistokes | Refractive Index at 90° C. | Penetration at 77° F.[5] | Urea Adduct, Percent |
|---|---|---|---|---|---|---|
| Product—Example 1 | 123.0 | [2] 0.78 | 20.43 | 1.4490 | 33 | <1 |
| Product—Example 4 | 133.0 | [2] 0.25 | | 1.4480 | | <1 |
| Crude Petrolatum | 174.5 | [3] 5-6 | 19.72 | 1.4495 | 57 | 17 |
| Commercial Meat Packaging Wax | 133.5 | [3] 8.76 | 18.96 | 1.4453 | | 23 |
| Microcrystalline Wax "A" | 170.0 | [3] 6.58 | 14.83 | 1.4460 | 30 | 31 |
| Hard Wax—First Precipitate—Example 1 | 189.0 | [3] 0.08 | 19.65 | 1.4440 | 9 | 67 |

[1] ASTM Method D-127.
[2] ASTM Method D-721-56T.
[3] ASTM Method D-721-56T with modified solvent, 50/50 toluene-2-butanone.
[4] ASTM Method D-88-56.
[5] ASTM Method D1321-57T.

as for example, 45° F. or higher, the resulting product is brittle; and a coating prepared from such a product when subjected to low temperatures tends to crack.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A method of preparing a non-tacky microcrystalline wax useful as a coating for food products, which comprises dissolving crude petrolatum in a solvent consisting of 40 to 60 volume percent toluene and 60 to 40 volume percent 2-butanone at a temperature varying from 120 to 150° F., wherein the solvent to crude petrolatum ratio varies from 2 to 10 milliliters of solvent per gram of crude petrolatum, cooling the resulting solution to a temperature within the range of 70 to 100° F., thereby causing the formation of a solid phase and a liquid phase, removing the solid phase from the liquid phase, cooling the separated liquid phase to a temperature within the range of 30 to 40° F., thereby causing the formation of a second solid phase and a second liquid phase, and then recovering therefrom said second solid phase comprising said non-tacky microcrystalline wax having the following properties: melting point within the range of about 123 to about 133° F., an oil content not greater than about 0.78 percent, flexible at −25° F., resistant to thermal shock, and substantially free of straight-chain paraffinic hydrocarbons.

2. A method of preparing a non-tacky microcrystalline wax useful as a coating for food products, which comprises dissolving crude petrolatum in a solvent consisting of 50 volume percent toluene and 50 volume percent 2-butanone at a temperature varying from 120 to 150° F., wherein the solvent to crude petrolatum ratio varies from 2 to 10 milliliters of solvent per gram of crude petrolatum, cooling the resulting solution to a temperature within the range of 70 to 100° F., thereby causing the formation of a solid phase and a liquid phase, removing the solid phase from the liquid phase, cooling the separated liquid phase to a temperature within the range of 30 to 40° F., thereby causing the formation of a second solid phase and a second liquid phase, and then recovering therefrom said second solid phase comprising said non-tacky microcrystalline wax having the following properties: melting point within the range of about 123 to about 133° F., an oil content not greater than about 0.78 percent, flexible at −25° F., resistant to thermal shock, and substantially free of straight-chain paraffinic hydrocarbons.

3. A method of preparing a non-tacky microcrystalline wax useful as a coating for food products, which comprises dissolving crude petrolatum in a solvent consisting of 40 to 60 volume percent toluene and 60 to 40 volume percent 2-butanone at a temperature varying from 120 to 150° F., wherein the solvent to crude petrolatum ratio varies from 4 to 6 milliliters of solvent per gram of crude petrolatum, cooling the resulting solution to a temperature within the range of 70 to 100° F., thereby causing the formation of a solid phase and liquid phase, removing the solid phase from the liquid phase, washing the solid phase with a solvent consisting of 40 to 60 volume percent toluene and 60 to 40 volume percent 2-butanone at a temperature in the range of 70 to 100° F., combining the wash liquids with the liquid phase, cooling the separated combined liquid phase and washings to a temperature within the range of 30 to 40° F., thereby causing the formation of a second solid phase and a second liquid phase, washing said second solid phase with a solvent consisting of 40 to 60 volume percent toluene and 60 to 40 volume percent 2-butanone at a temperature in the range of 30 to 40° F., and then recovering said second solid phase comprising said non-tacky microcrystalline wax having the following properties: melting point within the range of about 123 to about 133° F., an oil content not greater than about 0.78 percent, flexible at −25° F., resistant to thermal shock, and substantially free of straight-chain paraffinic hydrocarbons.

References Cited in the file of this patent

UNITED STATES PATENTS

| | | |
|---|---|---|
| 2,050,428 | Diggs et al. | Aug. 11, 1936 |
| 2,624,501 | Ferris | Jan. 6, 1953 |
| 2,624,693 | Ferris | Jan. 6, 1953 |
| 2,723,941 | Weeks et al. | Nov. 15, 1955 |
| 2,783,183 | Ferris | Feb. 26, 1957 |
| 2,798,028 | Perry et al. | July 2, 1957 |
| 2,850,432 | Richer et al. | Sept. 2, 1958 |
| 2,983,664 | Camilli | May 9, 1961 |